US008513323B2

(12) United States Patent
Zhou et al.

(10) Patent No.: US 8,513,323 B2
(45) Date of Patent: Aug. 20, 2013

(54) MULTIFUNCTIONAL SILICONE BLENDS

(75) Inventors: Peiguang Zhou, Appleton, WI (US); Lisha Yu, Appleton, WI (US)

(73) Assignee: Kimbery-Clark Worldwide, Inc., Neenah, WI (US)

( * ) Notice: Subject to any disclaimer, the term of this patent is extended or adjusted under 35 U.S.C. 154(b) by 775 days.

(21) Appl. No.: 12/001,674

(22) Filed: Dec. 12, 2007

(65) Prior Publication Data

US 2008/0319099 A1 Dec. 25, 2008

Related U.S. Application Data

(60) Provisional application No. 60/937,009, filed on Jun. 22, 2007.

(51) Int. Cl.
| A61K 6/083 | (2006.01) |
| A42B 1/18 | (2006.01) |
| B32B 9/04 | (2006.01) |
| B32B 27/08 | (2006.01) |
| B32B 9/00 | (2006.01) |

(52) U.S. Cl.
USPC ........ 523/105; 2/171; 2/173; 2/206; 428/447; 428/520; 428/689

(58) Field of Classification Search
USPC ........................................................ 523/105
See application file for complete search history.

(56) References Cited

U.S. PATENT DOCUMENTS

| 3,338,992 | A | | 8/1967 | Kinney |
| 3,341,394 | A | | 9/1967 | Kinney |
| 3,502,763 | A | | 3/1970 | Hartmann |
| 3,542,615 | A | | 11/1970 | Dobo et al. |
| 3,692,618 | A | | 9/1972 | Dorschner et al. |
| 3,802,817 | A | | 4/1974 | Matsuki et al. |
| 3,849,241 | A | | 11/1974 | Butin et al. |
| 4,340,563 | A | | 7/1982 | Appel et al. |
| 4,374,888 | A | | 2/1983 | Bornslaeger |
| 4,443,513 | A | | 4/1984 | Meitner et al. |
| 4,631,933 | A | | 12/1986 | Carey, Jr. |
| 4,652,487 | A | | 3/1987 | Morman |
| 4,655,760 | A | | 4/1987 | Morman et al. |
| 4,657,802 | A | | 4/1987 | Morman |
| 4,720,415 | A | | 1/1988 | Vander Wielen et al. |
| 4,781,966 | A | | 11/1988 | Taylor |
| 4,789,699 | A | | 12/1988 | Kieffer et al. |
| 4,865,920 | A | | 9/1989 | Sweet |
| 4,891,957 | A | | 1/1990 | Strack et al. |
| 4,965,122 | A | | 10/1990 | Morman |
| 4,981,747 | A | | 1/1991 | Morman |
| 5,114,781 | A | | 5/1992 | Morman |
| 5,147,916 | A | * | 9/1992 | Sweet ............................ 524/266 |
| 5,213,881 | A | | 5/1993 | Timmons et al. |
| 5,226,992 | A | | 7/1993 | Morman |
| 5,244,482 | A | | 9/1993 | Hassenboehler, Jr. et al. |
| 5,322,061 | A | | 6/1994 | Brunson |
| 5,328,696 | A | | 7/1994 | Noel |
| 5,336,545 | A | | 8/1994 | Morman |
| 5,350,624 | A | | 9/1994 | Georger et al. |
| 5,352,722 | A | * | 10/1994 | Sweet et al. ................... 524/266 |
| 5,371,128 | A | * | 12/1994 | Ulman et al. .................. 524/265 |
| 5,830,505 | A | * | 11/1998 | Fischer et al. ................ 424/487 |
| 6,294,200 | B1 | * | 9/2001 | Conte et al. ................... 424/472 |
| 6,630,238 | B2 | * | 10/2003 | Hyde et al. .............. 428/355 EN |
| 6,846,508 | B1 | * | 1/2005 | Colas et al. ................... 427/2.31 |
| 7,012,110 | B2 | * | 3/2006 | Sherman et al. .............. 524/267 |
| 2002/0046754 | A1 | * | 4/2002 | Baumann et al. ........ 128/206.13 |
| 2002/0119111 | A1 | * | 8/2002 | Kilgour et al. ............... 424/70.1 |
| 2003/0175328 | A1 | * | 9/2003 | Shefer et al. ................... 424/449 |
| 2004/0086473 | A1 | * | 5/2004 | Rabe et al. ....................... 424/63 |
| 2005/0031861 | A1 | * | 2/2005 | Matsumura et al. .......... 428/354 |
| 2005/0136266 | A1 | | 6/2005 | Zhou et al. |
| 2005/0203478 | A1 | | 9/2005 | Veglio et al. |
| 2005/0244442 | A1 | * | 11/2005 | Sabino et al. ................... 424/401 |
| 2006/0104940 | A1 | * | 5/2006 | Heinrichs et al. .......... 424/78.03 |
| 2006/0171908 | A1 | * | 8/2006 | Hanatani et al. ................ 424/61 |
| 2007/0185464 | A1 | | 8/2007 | Fattman et al. |

FOREIGN PATENT DOCUMENTS

| EP | 1 083 204 A1 | 3/2001 |
| EP | 1 815 876 A2 | 8/2007 |
| FR | 2749176 A1 * | 12/1997 |
| WO | WO 2006/028612 A1 | 3/2006 |

OTHER PUBLICATIONS

Derwent Abstract for FR 2749176 A1, Bouhadana, C. N., Dec. 5, 1997.*
Derwent Abstract of FR Patent Pub No. 2749176 A1, Bouhadana, C.N., Dec. 5, 1997.*
Dow Corning BIO-PSA Standard Silicone Adhesives, Dow Corning, Jul. 28, 2008, published by Dow Corning Corporation.*
"Dow Corning BIO-PSA Standard Silicone Adhesives", by Dow Corning, 02728/2008.*
"Dow Corning BIO-PSA Amine-Compatible Silicone Adhesvies", by Dow Corning, Jul. 28, 2008.*
Derwent Abstract of FR 2749176 A1, Bouhadana, C.N., 1998.*
"Silicone Adhesives," Dow Corning Healthcare Selection Guide, Product Information Form No. 51-988B-01, available prior to Jun. 5, 2007, pp. 6-7.
"Silicone Adhesives for Transdermal and Topical Drug Delivery, Medical Devices and Wound Care," Dow Corning Healthcare Solutions, Product Information Form No. 52-1070A-01, 2006, 6 pages.

* cited by examiner

*Primary Examiner* — Peter F Godenschwager
*Assistant Examiner* — David Karst
(74) *Attorney, Agent, or Firm* — Denise L. Stoker; David J. Arteman; H. Michael Kubicki

(57) ABSTRACT

Generally silicone materials adapted to releasably adhere to human skin don't attach readily to substrates such as fibrous substrates (e.g., woven and nonwoven webs), films, plastic, etc. Disclosed are inventive blends of low-tack materials, such as a low-tack silicone material, and a high-tack silicone material, such as a high-tack, hot-melt, silicone adhesive, that both releasably adhere to skin and join to various substrates, including fibrous substrates. Furthermore, these same blends may be disposed between, and attached to, a silicone adhesive layer and a substrate. In other words, the disclosed silicone blends may be used to join a silicone adhesive layer to a substrate.

6 Claims, No Drawings

MULTIFUNCTIONAL SILICONE BLENDS

Applicants hereby claim the benefit of presently co-pending U.S. Provisional Application Ser. No. 60/937009 filed on Jun. 22, 2007. The entirety of U.S. Provisional Application Ser. No. 60/937009 is hereby incorporated by reference.

BACKGROUND

People use respirators to avoid breathing certain substances (e.g., harmful gases, particulate matter, etc.), to avoid exhaling certain substances (e.g., droplets carrying germs), or both. The main body of a respirator typically fits over the mouth and nose of a user of the respirator. Accordingly, when the user exhales or inhales, air passes through the main body of the respirator, with the respirator then acting to filter the specific substances from the exhaled air or inhaled air.

The performance of the respirator depends, in part, on the fit between the respirator and the user's face. If the respirator is made of inflexible materials, then it may not readily conform to some of the complex contours of a face. As a result, flexible materials may be employed, for example at the perimeter of a respirator, to help provide a better fit. These flexible materials releasably engage skin. For example, a flexible polymeric material like rubber might be used for some portion of the main body of a re-usable respirator. In combination with straps that help pull the main body of the respirator toward a user's face, the rubber can help promote a gasket-like seal between the main body of the respirator and the face.

Some respirators, rather than being re-usable, are disposable. Such a respirator may be made from nonwoven materials, and might typically be used for a day or so. Often such respirators rely on the shape of the main body of the respirator, and the use of straps or strings attached to the main body of the respirator (and which wrap around the head of a user to help hold the respirator in place), to help conform the respirator to the face of a user.

Because neither of the aforementioned respirators adheres to the skin of a user, the position of either respirator may shift during use.

Various silicone materials, such as thermoplastic or thermoset materials in the form of a gel, film, foam, adhesive, and the like, have been identified as useful for releasably engaging skin. For example, silicone adhesives can exhibit desirable properties for gently adhering to skin. These same silicone adhesives can then be disengaged from the skin without painful pulling from, or injury to, skin with which the silicone adhesive is releasably engaged. Unfortunately, these same silicone adhesives typically do not satisfactorily adhere to other substrates. That is, such silicone adhesives, while satisfactorily adhering to, and releasing from, skin, typically do not adhere to other substrates such as a film, fibrous material (e.g., a woven or nonwoven), plastic, or other material.

What is needed is a material comprising silicone that is able to adhere to the surface of a substrate, such as a fibrous material typically used when constructing a respirator, while at the same time being capable of releasably engaging skin without causing injury or pain to the user of the substrate (e.g., a user of a respirator). Alternatively, this same material comprising silicone may be disposed between a silicone adhesive, such as a silicone gel adhesive or a silicone film adhesive, and a substrate such as a nonwoven, with the material comprising silicone joining the silicone adhesive to the substrate. In other words, the material comprising silicone facilitates attachment of the silicone adhesive to the substrate.

SUMMARY

We have discovered that substantially homogeneous silicone blends comprising a low-tack material (with low-tack materials encompassing no-tack materials), such as a low-tack silicone material, and a high-tack silicone material simultaneously provides two different adhesion characteristics. That is, our inventive blends are able to stick to substrates such as films, fibrous materials, plastic, and other materials, while at the same time being able to releasably adhere to skin (i.e., gently adhere to skin to help a substrate stay in place; but when pulled away, does so without injuring skin tissue). Alternatively, these same silicone blends may be used to join silicone adhesives (e.g., silicone gel adhesives or silicone film adhesives) to substrates such as fibrous webs. That is, the silicone blend is disposed between the silicone adhesive and the substrate. One surface of the silicone adhesive is available to releasably adhere to skin, while the other surface of the silicone adhesive is attached to the silicone blend, which in turn is attached to the substrate.

One version of the invention is a substantially homogeneous silicone blend adapted to both releasably adhere to human skin and attach to a non-living substrate. The formulation comprises a substantially homogeneous blend of a low-tack material, such as a low-tack silicone material; low-tack, silicone adhesive; low-tack, silicone gel; low-tack silicate; low-tack silicon oxide; or some combination thereof; and a high-tack silicone material (e.g., a high-tack silicone hot-melt adhesive). Specific examples of available silicone materials that may be blended in accordance with this invention are identified below.

In other versions of the invention, the substantially homogeneous silicone blend referred to above exhibits specific functional characteristics. In some exemplary embodiments, the homogenous silicone blends exhibit a peel force of between about 50 grams per inch to about 250 grams per inch when the silicone blend is detached from human skin; and a peel force of between about 500 grams per inch to about 1500 grams per inch when detached from a fibrous material or film. In other embodiments, the inventive silicone blends exhibit a peel force of between about 100 grams per inch to about 200 grams per inch, when the silicone blend is detached from human skin; and a peel force of between about 700 grams per inch to about 1100 grams per inch when detached from a fibrous material or film.

In some exemplary embodiments, the substantially homogenous silicone blends exhibit a 90-degree peel force of between about 50 grams per inch to about 250 grams per inch when the silicone blend is detached from human skin; and a 180-degree peel force greater than about 500 grams per inch when detached from the substrate to which the blend is attached up to the 180-degree peel force at which the substrate fails. The substrate to which the silicone blends are attached may be a film, nonwoven, tissue, fluff, superabsorbent, or some combination thereof.

Another version of the invention is a laminate adapted to releasably adhere to human skin. The laminate comprises a substrate and a substantially homogeneous silicone blend attached to at least a portion of the substrate, wherein the blend is adapted to releasably adhere to human skin. The formulation comprises a substantially homogeneous blend of a low-tack material, such as a low-tack silicone material, and a high-tack silicone material (e.g., a high-tack silicone hot-melt adhesive). In some versions of the invention, the silicone blend exhibits peel-force properties like those recited above.

Another laminate of the present invention is also adapted to releasably adhere to human skin. The laminate comprises a substrate, a silicone adhesive layer adapted to releasably adhere to human skin, and a substantially homogeneous silicone blend disposed between the substrate and the silicone adhesive layer, wherein the silicone blend is attached to at least a portion of the substrate and at least a portion of the silicone adhesive layer. The formulation comprises a substantially homogeneous blend of a low-tack material, such as a low-tack silicone material, and a high-tack silicone material (e.g., a high-tack silicone hot-melt adhesive). In some versions of the invention, the silicone blend exhibits peel-force properties like those recited above.

Another version of the invention is a respirator comprising a main body adapted to cover the mouth and nose of a user of the respirator; and a substantially homogeneous silicone blend attached to at least a portion of the main body of the respirator and adapted to releasably adhere to at least a portion of the face of the user. The blend comprises a low-tack material, such as a low-tack silicone material, and a high-tack silicone material (e.g., a high-tack silicone hot-melt adhesive).

Another version of the invention is a respirator comprising a main body adapted to cover the mouth and nose of a user of the respirator; a substantially homogeneous silicone blend attached to at least a portion of the main body of the respirator; and a silicone adhesive attached to the homogeneous silicone blend, wherein the silicone adhesive is adapted to releasably adhere to at least a portion of the face of the user. The blend comprises a low-tack material, such as a low-tack silicone material, and a high-tack silicone material (e.g., a high-tack silicone hot-melt adhesive).

In some representative versions of the present invention, a release backing, such as a film, paper, liner, or other such substrate, is disposed over the homogeneous silicone blend and/or any silicone adhesive layer attached to said blend. The release backing, which may be pulled away when desired, serves to avoid undesirable attachment of the silicone blend and/or any silicone adhesive layer attached to said blend to various surfaces (e.g., to avoid attachment of any product employing the silicone blend and/or any silicone adhesive layer attached to said blend to, for example: any packaging containing the product; any surface exposed to the product prior to a user wishing to use the product; any surface of production equipment during manufacture of the product; etc.).

Another representative version of the invention is a method for helping promote the health and safety of a user of a respirator. The method comprises the steps of positioning in the hands of a user an inventive respirator as described herein; and using the respirator.

Another version of the invention is a method of preparing a laminate, the method comprising the steps of providing a substantially homogeneous silicone blend comprising a high-tack silicone material and a low-tack material; providing a substrate; and applying the silicone blend to at least a portion of the substrate.

In some versions of the invention, applying the silicone blend is achieved by blowing (e.g., melt blowing, or using melt blowing techniques), spraying, coating, or printing the silicone blend on at least a portion of the substrate.

In some versions of the invention, the aforementioned method of preparing a laminate also includes the step of applying a release backing to at least a portion of the silicone blend.

In some versions of the invention, the aforementioned method of preparing a laminate also includes the steps of providing a silicone adhesive film; and attaching the silicone adhesive film to the silicone blend so that the silicone blend is disposed between the substrate and the silicone adhesive film.

Other representative versions of the invention include methods for making one or more of the products, components, blends, or subassemblies described above.

These and other representative embodiments of the present invention are described herein.

DESCRIPTION

"Attach" and its derivatives refer to the joining, adhering, connecting, bonding, sewing together, or the like, of two elements. Two elements will be considered to be attached together when they are integral with one another or attached directly to one another or indirectly to one another, such as when each is directly attached to intermediate elements. "Attach" and its derivatives include permanent, releasable, or refastenable attachment. In addition, the attachment can be completed either during the manufacturing process or by the end user.

"Bond," "interbond," and their derivatives refer to the joining, adhering, connecting, attaching, sewing together, or the like, of two elements. Two elements will be considered to be bonded or interbonded together when they are bonded directly to one another or indirectly to one another, such as when each is directly bonded to intermediate elements. "Bond" and its derivatives include permanent, releasable, or refastenable bonding. "Autogenous bonding," as described above, is a type of "bonding."

"Connect" and its derivatives refer to the joining, adhering, bonding, attaching, sewing together, or the like, of two elements. Two elements will be considered to be connected together when they are connected directly to one another or indirectly to one another, such as when each is directly connected to intermediate elements. "Connect" and its derivatives include permanent, releasable, or refastenable connection. In addition, the connecting can be completed either during the manufacturing process or by the end user.

"Coform" refers to a blend of meltblown fibers and absorbent fibers such as cellulosic fibers that can be formed by air forming a meltblown polymer material while simultaneously blowing air-suspended fibers into the stream of meltblown fibers. The coform material may also include other materials, such as superabsorbent materials. The meltblown fibers and absorbent fibers are collected on a forming surface, such as provided by a belt. The forming surface may include a gas-pervious material that has been placed onto the forming surface. Two U.S. patents describing coform materials are U.S. Pat. No. 5,100,324 to Anderson et al. and U.S. Pat. No. 5,350,624 to Georger et al., both of which are incorporated in their entirety in a manner consistent herewith.

"Disposable" refers to articles that are designed to be discarded after a limited use rather than being restored for reuse.

The terms "disposed on," "disposed along," "disposed with," or "disposed toward" and variations thereof are intended to mean that one element can be integral with another element, or that one element can be a separate structure bonded to or placed with or placed near another element.

"Layer" when used in the singular can have the dual meaning of a single element or a plurality of elements.

"Meltblown" refers to fibers formed by extruding a molten thermoplastic material through a plurality of fine, usually circular, die capillaries as molten threads or filaments into converging high velocity gas (e.g., air) streams, generally heated, which attenuate the filaments of molten thermoplastic material to reduce their diameters. Thereafter, the meltblown fibers are carried by the high velocity gas stream and are deposited on a collecting surface or support to form a web of randomly dispersed meltblown fibers. Such a process is disclosed, for example, in U.S. Pat. No. 3,849,241 to Butin et al. Meltblowing processes can be used to make fibers of various dimensions, including macrofibers (with average diameters from about 40 to about 100 microns), textile-type fibers (with average diameters between about 10 and 40 microns), and microfibers (with average diameters less than about 10 microns). Meltblowing processes are particularly suited to making microfibers, including ultra-fine microfibers (with an average diameter of about 3 microns or less). A description of an exemplary process of making ultra-fine microfibers may be found in, for example, U.S. Pat. No. 5,213,881 to Timmons et al. Meltblown fibers may be continuous or discontinuous and are generally self bonding when deposited onto a collecting surface.

"Nonwoven" and "nonwoven web" refer to materials and webs of material that are formed without the aid of a textile weaving or knitting process. For example, nonwoven materials, fabrics or webs have been formed from many processes such as, for example, meltblowing processes, spunbonding processes, air laying processes, coform processes, and bonded carded web processes.

"Spunbonded fibers" refers to small diameter fibers which are formed by extruding molten thermoplastic material as filaments from a plurality of fine, usually circular capillaries of a spinneret with the diameter of the extruded filaments then being rapidly reduced to fibers as by, for example, in U.S. Pat. No. 4,340,563 to Appel et al.; U.S. Pat. No. 3,692,618 to Dorschner et al.; U.S. Pat. No. 3,802,817 to Matsuki et al.; U.S. Pat. Nos. 3,338,992 and 3,341,394 to Kinney; U.S. Pat. No. 3,502,763 to Hartman; and U.S. Pat. No. 3,542,615 to Dobo et al., the contents of which are incorporated herein by reference in their entirety. Spunbond fibers are generally continuous and have diameters generally greater than about 7 microns, more particularly, between about 10 and about 20 microns.

"Stretch bonded laminate" refers to a composite material having at least two layers in which one layer is a gatherable layer and the other layer is an elastic layer. The layers are joined together when the elastic layer is extended from its original condition so that upon relaxing the layers, the gatherable layer is gathered. Such a multilayer composite elastic material may be stretched to the extent that the nonelastic material gathered between the bond locations allows the elastic material to elongate. One type of stretch bonded laminate is disclosed, for example, by U.S. Pat. No. 4,720,415 to Vander Wielen et al., the content of which is incorporated herein by reference in its entirety. Other composite elastic materials are disclosed in U.S. Pat. No. 4,789,699 to Kieffer et al.; U.S. Pat. No. 4,781,966 to Taylor; U.S. Pat. Nos. 4,657,802 and 4,652,487 to Morman; and U.S. Pat. No. 4,655,760 to Morman et al., the contents of which are incorporated herein by reference in their entirety.

"Necking" or "neck stretching" interchangeably refer to a method of elongating a nonwoven fabric, generally in the machine direction, to reduce its width (cross-machine direction) in a controlled manner to a desired amount. The controlled stretching may take place under cool, room temperature or greater temperatures and is limited to an increase in overall dimension in the direction being stretched up to the elongation required to break the fabric, which in most cases is about 1.2 to 1.6 times. When relaxed, the web retracts toward, but does not return to, its original dimensions. Such a process is disclosed, for example, in U.S. Pat. No. 4,443,513 to Meitner and Notheis; U.S. Pat. Nos. 4,965,122, 4,981,747 and 5,114,781 to Morman; and U.S. Pat. No. 5,244,482 to Hassenboehier Jr. et al., the contents of which are incorporated herein by reference in their entirety.

"Necked material" refers to any material which has undergone a necking or neck stretching process.

"Reversibly necked material" refers to a material that possesses stretch and recovery characteristics formed by necking a material, then heating the necked material, and cooling the material. Such a process is disclosed in U.S. Pat. No. 4,965,122 to Morman, commonly assigned to the assignee of the present invention, and incorporated by reference herein in its entirety. As used herein, the term "neck bonded laminate" refers to a composite material having at least two layers in which one layer is a necked, non-elastic layer and the other layer is an elastic layer. The layers are joined together when the non-elastic layer is in an extended (necked) condition. Examples of neck-bonded laminates are such as those described in U.S. Pat. Nos. 5,226,992; 4,981,747; 4,965,122 and 5,336,545 to Morman, the contents of which are incorporated herein by reference in their entirety.

"Stitchbonded" refers to a process in which materials (fibers, webs, films, etc.) are joined by stitches sewn or knitted through the materials. Examples of such processes are illustrated in U.S. Pat. No. 4,891,957 to Strack et al. and U.S. Pat. No. 4,631,933 to Carey, Jr., the contents of which are incorporated herein by reference in their entirety.

"Ultrasonic bonding" refers to a process in which materials (fibers, webs, films, etc.) are joined by passing the materials between a sonic horn and anvil roll. An example of such a process is illustrated in U.S. Pat. No. 4,374,888 to Bornslaeger, the content of which is incorporated herein by reference in its entirety.

"Thermal point bonding" involves passing materials (fibers, webs, films, etc.) to be bonded between a heated calender roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. Typically, the percent bonding area varies from around 10 percent to around 30 percent of the area of the fabric laminate. As is well known in the art, thermal point bonding holds the laminate layers together and imparts integrity to each individual layer by bonding filaments and/or fibers within each layer.

"Elastic" refers to any material, including a film, fiber, nonwoven web, or combination thereof, which upon application of a biasing force in at least one direction, is stretchable to a stretched, biased length which is at least about 110 percent, suitably at least about 130 percent, and particularly at least about 150 percent, its relaxed, unstretched length, and which will recover at least 15 percent of its elongation upon release of the stretching, biasing force. In the present application, a material need only possess these properties in at least one direction to be defined as elastic.

"Extensible and retractable" refers to the ability of a material to extend upon stretch and retract upon release. Extensible and retractable materials are those which, upon application of a biasing force, are stretchable to a stretched, biased length and which will recover a portion, preferably at least about 15 percent, of their elongation upon release of the stretching, biasing force.

As used herein, the terms "elastomer" or "elastomeric" refer to polymeric materials that have properties of stretchability and recovery.

"Stretch" refers to the ability of a material to extend upon application of a biasing force. Percent stretch is the difference between the initial dimension of a material and that same dimension after the material has been stretched or extended following the application of a biasing force. Percent stretch may be expressed as [(stretched length−initial sample length)/initial sample length]×100. For example, if a material having an initial length of one (1) inch is stretched 0.50 inch, that is, to an extended length of 1.50 inches, the material can be said to have a stretch of 50 percent.

"Recover" or "recovery" refers to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its elongation.

"Electret" or "electret treating" refers to a treatment that imparts a charge to a dielectric material, such as a polyolefin. The charge includes layers of positive or negative charges trapped at or near the surface of the polymer, or charge clouds stored in the bulk of the polymer. The charge also includes polarization charges which are frozen in alignment of the dipoles of the molecules. Methods of subjecting a material to electret treating are well known by those skilled in the art. These methods include, for example, thermal, liquid-contact, electron beam, and corona discharge methods. One particular technique of subjecting a material to electret treating is disclosed in U.S. Pat. No. 5,401,466 to Foltz et al., the contents of which is herein incorporated in its entirety by reference. This technique involves subjecting a material to a pair of electrical fields wherein the electrical fields have opposite polarities.

"Polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

"Silicone material" generally includes thermoplastic, thermoset, plastic, rubber, foam, gel, film, adhesive, or other such materials comprising silicone.

These terms may be defined with additional language in the remaining portions of the specification.

As noted above, respirators work better if they conform to the contours of the face of a user of the respirator. Disposable respirators—those that are used for a day or so and then thrown away—are typically made from relatively thin and flexible fibrous substrates (e.g., nonwoven materials). As such the substrate can bend and conform somewhat to surfaces around the nose and mouth of a user. Nevertheless, openings can still occur—typically at the periphery of the main body of the respirator that fits over and/or around the nose and mouth—such that exhaled or inhaled air passes through the opening rather than through the main body of the respirator. Whether or not such openings are present, the position of a respirator can shift during use. If such openings occur, then exhaled, moisture-laden air may contact safety glasses, potentially condensing on, and fogging, glass surfaces. Obviously, this can interfere, perhaps seriously, with the user's work. Alternatively, inhaled air passing through these openings, rather than the main body of the respirator, may lead to particulates or other components in the air passing directly into the lungs of the user. It is important to note that even if there is a reasonably close fit between the face of a user and a respirator when first donned, the respirator may subsequently move during use (e.g., due to a user speaking), thereby producing openings that can result in the aforementioned issues.

Silicone adhesives used in the medical industry are typically skin friendly, and attach to skin without causing irritation. Furthermore, such adhesives can help create a seal with the skin, and are moisture permeable, conformable, and soft. These adhesives are flexible enough such that, when a user's skin moves, the adhesive remains in contact with the skin (i.e., a gasket-like seal can be maintained in dynamic situations). Unfortunately, such adhesives typically do not bond well to various substrates, including films, and fibrous substrates (e.g., a polyolefin nonwoven or a polyolefin film). Without being bound to a particular theory, for polyolefin materials this may be due to incompatible chemistries between a silicone adhesive and a polyolefin such as polyethylene or polypropylene, and/or differences between the surface energy of a silicone adhesive compared to the surface energy of a polyolefin material. Currently there does not appear to be a silicone adhesive suitable for skin that also provides for acceptable bonding to a substrate such as a polyolefin substrate.

For acceptable attachment to skin (i.e., satisfactory adhesion but which can be detached from the skin without irritation or injury to the skin), a silicone adhesive will typically have a 90-degree peel force of about 50 grams per inch; suitably about 100 grams per inch; more suitably about 250 grams per inch. But acceptable bonding to a substrate, such as a polyolefin substrate, might have a 180-degree peel force of about 500 grams per inch or more. It should be noted that one representative method by which peel force is measured is described below.

In some representative examples described below, we found that tested silicone adhesives, when used alone, provided satisfactory attachment to skin, but adhered poorly to various substrates, including a nonwoven polypropylene spunbond material and a film.

We have determined that a combination of a low-tack material (e.g. a solvent-based, low-tack, silicone material) and a high-tack silicone material (e.g., a high-tack, hot-melt, silicone adhesive) can provide both a satisfactory bond to substrates such as polyolefin substrates while at the same time having acceptable skin-attachment qualities (again, referring to ability of the material to releasably engage or adhere to the skin, without irritation or injury to the skin when the material is pulled away from the skin). Certainly the relative amounts of the low-tack material and the high-tack silicone material may be selected to provide the desired qualities of acceptable adhesion to skin and acceptable adhesion to a substrate.

Our inventive, substantially homogeneous, silicone blends may be employed in different ways. For example, the silicone blend can be attached to a substrate, such as a polyolefin nonwoven web or film, with the blend itself then available to releasably engage skin (to attach to the skin and/or form a seal against the skin). Alternatively the blend may be disposed between a substrate and, for example, another layer such as a less tacky, silicone adhesive film. In this latter case, the silicone adhesive film serves to releasably engage skin. The silicone blend is used to join the silicone adhesive film to the substrate.

Different approaches may be used to produce a silicone blend of the present invention. A low-tack material, such as a low-tack silicone material in liquid form, may be combined with a high-tack silicone material such as a silicone hot-melt adhesive, which is a solid at room temperature (i.e., substantially 100% solid). If the high-tack silicone material is in solid form such as this, the solid may be placed in a container having sufficient volume to hold both the high-tack silicone material and the low-tack material to be added. Typically a sufficient volume of the low-tack material will be added so that the high-tack silicone material is dissolved in the resulting mixture. Also, the mixture will typically be stirred or mechanically agitated in some way to facilitate combining the low-tack and high-tack materials.

The resulting blend can then be applied to one or more layers to produce a substrate or laminate adapted to releasably adhere to human skin. Typically the blend will have a viscosity and flow characteristics such that it can be pumped or conveyed from a tank to the unit operation by which the formulation will be applied to a substrate. The formulation may be sprayed, slot coated, printed, blown (e.g., melt-blown—but, typically, the formulation will not have to be melted prior to use of melt-blowing equipment) or otherwise applied to the surface of a substrate (e.g., a moving nonwoven web or film). Conventional equipment for processing and applying a hot-melt adhesive, or processing and applying other polymeric materials—such as those used to prepare synthetic fibers employed in nonwoven materials, may be used with silicone blends of the present invention. Typically the blend does not have to be heated to be pumped and applied. Instead the blend will typically be a liquid at room temperature, and therefore capable of being stored in tanks and pumped to a unit operation for applying the blend. If the blend is to be disposed between two or more layers, then the sequence of addition may be selected that provides for ease of manufacture and for promoting desired product performance. For example, if the silicone blend is to be disposed between a silicone adhesive film and a polypropylene nonwoven, then the blend may be coated first on the film, with the film/silicone blend then adhered to the nonwoven substrate. Or, alternatively, the silicone blend may be coated on the substrate, in this case a polypropylene nonwoven.

Either a silicone blend, or a combination of a silicone blend and silicone adhesive (e.g., a silicone adhesive film or gel), may be employed to help provide releasable engagement and/or seal between a respirator and skin. Examples of one or more materials used in respirators and/or facemasks are disclosed in U.S. Pat. No. 5,322,061; which is dated 21 Jun. 1994, and is entitled "Disposable Aerosol Mask" to Kevin K. Branson; and which is hereby incorporated by reference in its entirety in a manner consistent herewith; as well as in the references cited elsewhere in this disclosure, including those references cited in the Definitions section for various kinds of substrates and materials. Generally the selected materials by which the main body of the respirator is constructed are cut, slit, or otherwise configured into forms adapted to cover portions of a user's face (e.g., the nose and mouth of a user). If individual layers or components need be attached to one another to make the main body of the respirator, then said layers or components may be attached to one another using, for example, heat, adhesives, ultrasonic energy, mechanical attachment devices (e.g., hook-and-loop fasteners), sewing, and the like. As noted elsewhere, the materials may be pre-cut in some way to facilitate attachment to a fastening component. During construction of the respirator, or after it's assembled, a silicone blend of the present invention may be sprayed, coated, brushed, printed, blown, or otherwise applied to some portion of a surface of the respirator adapted to face or contact the skin of the user of the respirator. For example, the silicone blend may be applied to some portion of the perimeter of the main body of the respirator that will contact or face the skin of a user.

Typically a release layer or backing, such as a film, paper, liner, or other substrate, will be applied over the blend. By employing a release layer such as this, the respirator may be folded, packaged, shipped, and otherwise handled without portions of the respirator adhering to itself, packaging, or other surfaces. A user can then pull away the release layer or backing before using the respirator. Of course, other embodiments of the invention may also comprise a release layer or backing disposed over the surface of the silicone blend adapted to contact skin so that, for reasons just mentioned, the silicone blend does not undesirably stick to surfaces (until, of course, a user of the substrate employing the silicone blend wishes to use the substrate by attaching the associated silicone blend with skin).

Note too that a release layer or backing may be used with a silicone adhesive, such as a silicone adhesive film or gel. So, for example, an embodiment of the present invention comprising a silicone adhesive film or gel, a substrate, and a silicone blend disposed between, and attached to, both the substrate and the silicone adhesive film or gel, may also comprise a release layer disposed over the surface of the silicon adhesive film or gel adapted to releasably adhere to human skin. It should also understood that both the silicone blend and any silicone adhesive may have release layers disposed over a surface during production of a substrate employing the silicone blend or silicone adhesive. For the same reasons mentioned above, the use of such release layers during production can help avoid undesired attachment of the silicone blend (or silicone adhesive to which the silicone blend is joined) to various surfaces or webs.

EXAMPLES

Example 1

Two adhesives were obtained from Dow Corning Corporation, a business having offices at South Saginaw Rd, Midland, Mich. 48686: (1) Bio-PSA 7-4560 silicone hot-melt adhesive (reported as being 100% solid and having a viscosity of 25500 centipoise measured at 380 degrees Fahrenheit); and (2) Bio-PSA-74101 silicone adhesive (reported as being 60% solid in heptane and having a solution viscosity of 150 centipoise at 77 degrees Fahrenheit). The silicone hot-melt adhesive is a high-tack silicone material of high viscosity, and the silicone adhesive is a low-tack material of low viscosity.

These silicone materials were combined in various proportions in the following exemplary fashion. Forty grams of the high-tack, solid, silicone adhesive were placed in a 10-ounce glass jar. Sixty grams of the low-tack silicone adhesive were then poured into the jar. The mixture was stirred occasionally for 5 minute intervals, and then left over night at room temperature. After this procedure the solid silicone adhesive was completely dissolved. The mixture was a transparent, colorless, viscous solution having a Brookfield viscosity of 2400 centipoise at a temperature of 72 degrees Fahrenheit. This particular mixture was designated as formulation SAP-13. Other formulations were prepared in a similar fashion and included: (1) a combination of 30 grams of Bio-PSA-7-4560 (high-tack silicone adhesive) and 70 grams of Bio-PSA-7-4101 (low-tack silicone adhesive), having a Brookfield viscosity of about 1550 cps at 72 degrees Fahrenheit and designated as formulation SAP-12; and (2) a combination of 50 grams of Bio-PSA-7-4560 (high-tack silicone adhesive) and 50 grams of Bio-PSA-7-4101 (low-tack silicone adhesive), having a Brookfield viscosity of about 4750 centipoise at 72 degrees Fahrenheit and designated as formulation SAP-14.

Example 2

Combinations of substrates/layers and the silicone blends of Example 1 were prepared. A polypropylene spun-bond material having a basis weight of 0.5 ounces per square yard, a breathable outercover film employed in diaper products (i.e., a polypropylene film comprising a particulate filler), and an absorbent core (fluff/particulate superabsorbent material) were each obtained. Scotch-brand Master tape, obtained from the 3M Company, was applied to one side of each of these materials. After the three materials were reinforced on one side with tape, 2 inch by 6 inch samples were cut. For those laminates in which a blend of Example 1 was disposed between one of these 3 substrates and a silicone adhesive, silicone 7-9700 films were obtained from Dow Corning. Three different thicknesses were obtained: 10 mil, 20 mil, and 30 mil (mil=one thousandth of an inch). Applied to one side of these silicone films was a polyethylene backing.

Two types of samples were then prepared: (1) samples in which a silicone blend of Example 1 was disposed between a silicone film and one of the 3 substrates identified in the preceding paragraph; and (2) samples in which a silicone blend of Example 1 was applied directly to one of these 3 substrates without a silicone adhesive. For those samples in which a silicone blend of Example 1 was disposed between a silicone film and a substrate, silicone blend SAP-13 was applied to the surface of a 20 mil silicone film at an add-on level of about 100 grams per square meter. The blend was applied to that side of the silicone film without a polyethylene film backing. The silicone film with the applied formulation was then set aside for up to 5 minutes. The coated film was then adhered to each of the various substrates—with the coated side of the film facing that side of the substrate not reinforced with tape (i.e., the coated side of the film was attached to the substrate, not to the tape backing the substrate). A 2-inch wide, 2-kilogram roller (obtained from ChemInstruments, a business having offices in Fairfield, Ohio) was placed on top of the 3-layer laminate, and rolled along the length of the laminate, to help join the materials. The resulting structure, then, comprised one of the three substrates (polypropylene spunbond, polypropylene outercover film, or absorbent core), which was attached to the SAP-13 silicone blend of Example 1, which was attached to the silicone film. Prior to testing, the side of the substrate facing outward had backing tape attached to it, and the side of the silicone film facing outward had the polyethylene film backing attached to it. This same procedure was used to prepare other laminates listed in the Tables below.

As noted above, for another series of samples a silicone blend of Example 1 was applied directly to the surface of a substrate. Silicone blend SAP-13 or SAP-12 was applied to a polyethylene film at an add-on level of about 50 grams per square meter. After about 3 to 5 minutes, the coated side of the film was joined to one of the three substrates identified earlier (polypropylene spunbond, film, absorbent core). Again the 2-kilogram roller described above was used to help join the formulation of Example 1 to the substrate. All samples were allowed to sit at room temperature overnight before any physical testing.

Example 3

The exemplary combinations prepared in Example 2 were then tested for peel force. This peel force, or delamination force, measured the amount of tensile force per unit width of sample required to disengage materials from one another during a 180° peel test. While other tests may be used to compare combinations prepared with and without multifunctional silicone blends of the present invention, the method used for these comparisons employed the following steps.

(1) As mentioned above, each of the prepared samples was 2 inches wide and 6 inches long. Typically the peel force of 3 individual samples was measured, with the average of these 3 samples reported in the table below. The reported peel force is the average of the peak peel force measured during an experiment.

(2) The tensile tester was calibrated. One end of each sample was delaminated by hand so that sufficient material was present to clamp and hold the sample. For each sample, a first layer, such as the coated silicone film (i.e., the silicone film with a silicone blend of Example 1 coated on it), was inserted and clamped into the upper jaw of the tensile tester. The second layer, such as a polypropylene spunbond substrate, was inserted and clamped into the lower jaw of the tensile tester. Each jaw should have a suitable facing in contact with the sample to securely hold the first or second layer without slipping or breaking as the laminate is pulled apart. The jaws of the tensile tester were initially separated by 75 mm at the start of the test. For some tests, samples were adhered to a stainless steel plate. In these cases, the sample was adhered to the stainless steel plate using the 2-kilogram roller. An exposed portion of the stainless steel plate was then clamped into the lower jaw of the tensile tester, and an exposed portion of the sample adhered to the stainless steel plate was clamped into the upper jaw of the tensile tester. Samples were then delaminated from the stainless steel plate. For peel testing off human skin (in this case the underside of a forearm such that the test sample was adhered to skin that was substantially free of the longer arm hair typically present at the top of the arm), a 90-degree peel test was conducted. The sample preparations were the same as the 180-degree peel test off the stainless steel plates by using the 2-kilogram roller. Three specimens were also tested for each code. Data are summarized in the tables below.

(3) The tensile tester was set so that the jaws moved apart at a speed of 12 inches per minute. The test was continued until the sample was pulled apart or until one of the layers failed. An average peel force and peak peel force was then recorded. Different sampling rates, sampling periods, and crosshead movement durations can be used to obtain a statically valid average peel force for samples requiring a different sample size.

(4) After a sample delaminated or failed, the peak peel force per unit width for each sample was calculated by dividing the peak peel force in grams by the sample width in inches (i.e., 2 inches). Next a grand average was calculated for each sample set by averaging the three results obtained for each individual sample. The grand average for each sample set is reported in the tables below in grams per inch. Three specimens were also tested for each code. Suitable tensile testers for use with this test, among others, include the Sintech 2 tester, which was available from the Sintech Corporation, 1001 Sheldon Dr., Cary, N.C. 27513 (the Sintech Corporation which was acquired by MTS); the Instron Model™, available from the Instron Corporation, 2500 Washington St., Canton, Mass. 02021; the Thwing-Albert Model INTELLECT II, available from the Thwing-Albert Instrument Co., 10960 Dutton Rd., Philadelphia, Pa. 19154; or the MTS Alliance RT/1400, available from MTS Corporation, a business having offices in Eden Prairie, Minn.

Data from these tests are presented in Tables 1 and 2 below.

TABLE 1

| Laminate | Peel force/ g/in (average in peak load) | Failure modes |
| --- | --- | --- |
| 7-9700 film/stainless steel | 240 | adhesive failure |
| 7-9700 film/SAP-13/stainless steel | 1430 | 7-9700 film broke; material failure |
| 7-9700 film/spunbond | 150 | adhesive failure |
| 7-9700 film/SAP-13/spunbond | 930 | 7-9700 film broke; material failure |
| 7-9700 film/PE film | 110 | adhesive failure |
| 7-9700 film/SAP-13/PE film | 990 | 7-9700 film broke; material failure |
| 7-9700 film/PP film | 330 | adhesive failure |
| 7-9700 film/SAP-13/PP film | 1010 | PP film broke; material failure |
| PP film/7-9700 film | 290 | adhesive failure |
| PP film/SAP-13/7-9700 film* | 1090 | PP film broke; material failure |
| 7-9700 film/absorbent core | 130 | adhesive failure |
| 7-9700 film/SAP-13/absorb. core | 720 | absorbent core broke; material failure |

*SAP-13 was coated on the PP film, then laminated with 7-9700 silicone film

In Table 1 above, the first comparison shows that a peak load (or peel force) of 240 grams per inch was measured when a silicone adhesive film was peeled away from a stainless steel plate. When silicone blend SAP-13 is disposed between the silicone adhesive film and the stainless steel plate, the peel force increased to 1430 grams per inch. Furthermore, failure in this latter case was due to the silicone adhesive film breaking—a material failure—rather than an adhesive failure. In the second comparison, a peak load (or peel force) of 150 grams per inch was measured when a silicone adhesive film was peeled away from a polypropylene spunbond having a basis weight of 0.5 ounces per square yard. When silicone blend SAP-13 is disposed between the silicone adhesive film and the polypropylene spunbond, the peel force increased to 930 grams per inch. Furthermore, failure in this latter case was due to the silicone adhesive film breaking—a material failure—rather than an adhesive failure. In the third comparison, a peak load (or peel force) of 110 grams per inch was measured when a silicone adhesive film was peeled away from a polyethylene film. When silicone blend SAP-13 was disposed between the silicone adhesive film and the polyethylene film, the peel force increased to 990 grams per inch. Furthermore, failure in this latter case was due to the silicone adhesive film breaking—a material failure—rather than an adhesive failure. In the fourth comparison, a peak load (or peel force) of 330 grams per inch was measured when a silicone adhesive film was peeled away from a polypropylene, outercover film. When silicone blend SAP-13 was disposed between the silicone adhesive film and the polypropylene outercover film, the peel force increased to 1010 grams per inch. Furthermore, failure in this latter case was due to the polypropylene film breaking—a material failure—rather than an adhesive failure. In the fifth comparison, a peak load (or peel force) of 290 grams per inch was measured when a silicone adhesive film was peeled away from a polypropylene, outercover film. When silicone blend SAP-13 was disposed between the silicone adhesive film and the polypropylene outercover film, the peel force increased to 1090 grams per inch. Furthermore, failure in this latter case was due to the polypropylene film breaking—a material failure—rather than an adhesive failure. The difference between the fourth and fifth comparison is as follows. In the fourth comparison, the SAP-13 blend was first coated on one side of the silicone adhesive film, and then this coated side of the silicone adhesive film was attached to the polypropylene outercover film. In the fifth comparison, the SAP-13 blend was first coated on one side of the polypropylene outercover film, and then this coated side of the polypropylene outercover film was attached to the silicone adhesive film. In the sixth comparison, a peak load (or peel force) of 130 grams per inch was measured when a silicone adhesive film was peeled away from a cellulosic fluff/superabsorbent absorbent core. When silicone blend SAP-13 was disposed between the silicone adhesive film and the absorbent core, the peel force increased to 720 grams per inch. Furthermore, failure in this latter case was due to the absorbent core breaking—a material failure—rather than an adhesive failure.

TABLE 2

| Laminate | Peel g/in (average in peak load) | Failure modes |
| --- | --- | --- |
| 7-9700 film/human skin | 200 | — |
| PE film/SAP-13/human skin | 160 | — |
| PE film/SAP-12/human skin | 120 | — |
| PE film/SAP-13/absorbent core | 120 | absorbent core broke; material failure |
| PE film/SAP-13/spunbond | 1050 | spunbond broke; material failure |
| PE film/SAP-13/PP film | 1030 | PP film broke; material failure |

The first entry in Table 2 shows that the peak load (or peel force) at which the identified silicone adhesive film peels from skin is 200 grams per inch (as noted above, this was determined with a 90-degree peel test rather than the 180-degree peel test). Silicone blends SAP-13 and SAP-12 peeled away from skin at measured peak loads of 160 grams per inch and 120 grams per inch, respectively (with each of these silicone blends coated on a polyethylene film). The remaining three entries give the peak loads at which silicone blend SAP-13 (coated on a polyethylene film) peels away from a fluff/superabsorbent absorbent core, an 0.5 ounce-per-square-yard polypropylene spunbond, and a polypropylene outercover film, respectively: 120 grams per inch (due to material failure of the absorbent core); 1050 grams per inch (due to material failure of the spunbond material); and 1030 grams per inch (due to material failure of the polypropylene film).

Example 4

An adhesive was obtained from Dow Corning Corporation, a business having offices at South Saginaw Rd, Midland, Mich. 48686: Bio-PSA 7-4560 silicone hot-melt adhesive (reported as being 100% solid and having a viscosity of 25500 centipoise measured at 380 degrees Fahrenheit).

The Bio-PSA 7-4560 adhesive was dissolved in ethyl acetate (pure solvent) to make a solution having 40% by weight of the adhesive. Forty grams of the high-tack, solid, silicone adhesive were placed in a 10-ounce glass jar. Sixty grams of ethyl acetate was then poured into the jar. The mixture was stirred occasionally for 10 to 20 minutes, and then left over night at room temperature. After this procedure the solid silicone adhesive was completely dissolved. The mixture was a substantially transparent solution having a Brookfield viscosity of 250 centipoise at a temperature of 72 degrees Fahrenheit.

Ten grams of the Bio-PSA 7-4560/ethyl acetate mixture was then placed in a two-ounce glass jar. Three-tenths of a gram of a cross-linked polyacrylate copolymer powder, identified as Polypore E-200, available from AMCOL, a business having offices in Arlington Heights, Ill., was then added to the Bio-PSA 7-4560/ethyl acetate mixture. The combination was stirred as the powder was being added. A cap was then screwed on to the top of the jar to close it. After being allowed to stand for one week at room temperature in this closed container, this combination of the Bio-PSA 7-4560/ethyl acetate mixture and Polypore E-200 powder was observed to be opaque, without any visually-detectable precipitate, suggesting that the Polypore E-200 powder was substantially uniformly distributed throughout the Bio-PSA 7-4560/ethyl acetate mixture. This formulation was designated as "SSA-8."

Another inventive formulation, designated as "SSA-9," was prepared in a manner similar to SSA-8, except that, one hour after three-tenths of a gram of Polypore E-200 was added (with stirring), one-half gram of REACH 103 powder was added (again with stirring so that the REACH 103 powder was substantially dispersed uniformly throughout the formulation). REACH 103 is an antiperspirant compound that includes aluminum chlorohydrate, and is available from Reheis, Inc., a business having offices in Berkeley Heights, N.J. After 48 hours the mixture appeared to be snow white with a slightly separated layer at the top.

Another inventive formulation, designated as "SSA-10," was prepared in a manner similar to SSA-8, except that, one-half gram of silicone gel was added (again, with stirring, until the added silicone gel was substantially uniformly distributed throughout the formulation; no REACH 103 or Polypore E-200 were added). The silica gel is available under the designator Syloid 224 from Grace Davison, W. R. Greace & Company, a business having offices in Columbia, Md. After one week no substantial separation was observed in the formulation.

Example 5

Combinations of substrates/layers and the silicone formulations of Example 4 were prepared. A polypropylene spunbond material having a basis weight of 0.5 ounces per square yard and a polyethylene film were each obtained. Scotch-brand Master tape, obtained from the 3M Company, was applied to one side of each of these materials. After the two materials were reinforced on one side with tape, 2 inch by 6 inch samples were cut.

Samples were then prepared in which a silicone formulation of Example 4 was applied directly to the reinforced polyethylene film. Silicone formulations SSA-8, SSA-9, and SSA-10 were stirred one minute prior to application to a polyethylene film, and then applied, using a brush, to the polyethylene film at an add-on level of about 50 grams per square meter (the add-on level was determined by weighing the film before and after application of the silicone formulations). After about 1 to 3 minutes, the coated side of the film was joined to skin, a spunbond material, or stainless steel. Again the 2-kilogram roller described above was used to help join the formulation of Example 4 to the substrate. All samples were allowed to sit at room temperature overnight before any physical testing.

Example 6

The exemplary combinations prepared in Example 5 were then tested for peel force. This peel force, or delamination force, measured the amount of tensile force per unit width of sample required to disengage materials from one another during a 180° peel test. While other tests may be used to compare combinations prepared with and without multifunctional silicone blends of the present invention, the method used for these comparisons employed the following steps.

(1) As mentioned above, each of the prepared samples was 2 inches wide and 6 inches long. Typically the peel force of 3 individual samples was measured, with the average of these 3 samples reported in the table below. The reported peel force is the average of the peak peel force measured during an experiment.

(2) The tensile tester was calibrated. One end of each sample was delaminated by hand so that sufficient material was present to clamp and hold the sample. For each sample, a first layer, such as the coated polyethylene film (i.e., the polyethylene film with a silicone blend of Example 4 coated on it), was inserted and clamped into the upper jaw of the tensile tester. The second layer, such as a polypropylene spunbond substrate, was inserted and clamped into the lower jaw of the tensile tester. Each jaw should have a suitable facing in contact with the sample to securely hold the first or second layer without slipping or breaking as the laminate is pulled apart. The jaws of the tensile tester were initially separated by 75 mm at the start of the test. For some tests, samples were adhered to a stainless steel plate. In these cases, the sample was adhered to the stainless steel plate using the 2-kilogram roller. An exposed portion of the stainless steel plate was then clamped into the lower jaw of the tensile tester, and an exposed portion of the sample adhered to the stainless steel plate was clamped into the upper jaw of the tensile tester. Samples were then delaminated from the stainless steel plate. For peel testing off human skin (in this case the underside of a forearm without hair), a 90-degree peel test was conducted. The sample preparations were the same as the 180-degree peel test off the stainless steel plates by using the 2-kilogram roller. Three specimens were also tested for each code. Data are summarized in the tables below.

(3) The tensile tester was set so that the jaws moved apart at a speed of 12 inches per minute. The test was continued until the sample was pulled apart or until one of the layers failed. An average peel force and peak peel force was then recorded. Different sampling rates, sampling periods, and crosshead movement durations can be used to obtain a statically valid average peel force for samples requiring a different sample size.

(4) After a sample delaminated or failed, the peak peel force per unit width for each sample was calculated by dividing the peak peel force in grams by the sample width in inches (i.e., 2 inches). Next a grand average was calculated for each sample set by averaging the three results obtained for each individual sample. The grand average for each sample set is reported in the tables below in grams per inch. Three specimens were also tested for each code. Suitable tensile testers for use with this test, among others, include the Sintech 2 tester, which was available from the Sintech Corporation, 1001 Sheldon Dr., Cary, N.C. 27513 (the Sintech Corporation was acquired by MTS); the Instron Model™, available from the Instron Corporation, 2500 Washington St., Canton, Mass. 02021; the Thwing-Albert Model INTELLECT II, available from the Thwing-Albert Instrument Co., 10960 Dutton Rd., Philadelphia, Pa. 19154; or the MTS Alliance RT/1400, available from MTS Corporation, a business having offices in Eden Prairie, Minn.

Data from these tests are presented in Table 3 below.

TABLE 3

| Laminate | Peel force/ g/in (average in peak load) | Failure modes |
| --- | --- | --- |
| PE film/SSA-8/skin | 30 | — |
| PE film/SSA-9/spunbond | 510 | spunbond failure |
| PE film/SSA-9/stainless steel | 270 | adhesive failure |
| PE film/SSA-9/skin | 110 | — |
| PE film/SSA-10/spunbond | 360 | spunbond failure |
| PE film/SSA-10/stainless steel | 290 | adhesive failure |
| PE film/SSA-10/skin | 110 | — |

In Table 3 above, the first comparison shows SSA-8 peeling away from skin at a measured peak load of 30 grams per inch (with the silicone formulation SSA-8 coated on a polyethylene film; as noted above, tests on skin employed a 90-degree peel test). We believe this value was low because the silicone blend SSA-8 was not coated uniformly as the film. The next three entries show the peak loads at which silicone formulation SSA-9 peeled away from an 0.5 ounce-per-square-yard polypropylene spunbond, stainless steel, and skin respectively: 510 grams per inch; 270 grams per inch; and 110 grams per inch. The final three entries show the peak loads at which silicone formulation SSA-10 peeled away from an 0.5 ounce-per-square-yard polypropylene spunbond, stainless steel, and skin respectively: 360 grams per inch; 290 grams per inch; and 110 grams per inch.

We claim:

1. A respirator comprising a laminate adapted to releasably engage human skin, the laminate comprising:
   a substrate;
   substantially homogeneous silicone blend attached to the substrate, wherein the silicone blend comprises
   a high-tack silicone material and
   a no-tack material; and
   a silicone adhesive film directly attached to the silicone blend.

2. A laminate adapted to releasably adhere to human skin comprising a substrate and a silicone blend attached to at least a portion of the substrate, wherein the blend is adapted to releasably adhere to human skin, and wherein the blend comprises a high-tack silicone material and a no-tack material and wherein the substrate is a nonwoven, film, fluff, superabsorbent, or some combination thereof and wherein the no-tack material is a cross-linked polyacrylate copolymer powder and the weight ratio of the high-tack silicone material to the no-tack material is about 13.3 to 1.

3. The laminate of claim 2 wherein the high-tack silicone material is a high-tack, hot-melt, silicone adhesive.

4. The blend of claim 2 wherein the blend exhibits a 90-degree peel force of between about 50 grams per inch to about 250 grams per inch when detached from human skin, and wherein the blend exhibits a 180-degree peel force greater than about 500 grams per inch when detached from the substrate to which the blend is attached up to the 180-degree peel force at which the substrate fails.

5. A laminate adapted to releasably adhere to human skin comprising a substrate and a silicone blend attached to at least a portion of the substrate, wherein the blend is adapted to releasably adhere to human skin, and wherein the blend comprises a high-tack silicone material and a no-tack material and wherein the substrate is a nonwoven, film, fluff, superabsorbent, or some combination thereof and wherein the no-tack material is a cross-linked polyacrylate copolymer powder and an antiperspirant compound that includes aluminum chlorohydrate, wherein the weight ratio of the high-tack silicone material to the no-tack material is about 5 to 1.

6. The laminate of claim 5 wherein the weight ratio of the antiperspirant compound to the cross-linked polyacrylate copolymer powder is about 1.7 to 1.

* * * * *